United States Patent [19]

Lia

[11] Patent Number: 4,761,695
[45] Date of Patent: Aug. 2, 1988

[54] METHOD AND ARRANGEMENT FOR RECORDING DATA ON A MAGNETIC RECORDING MEDIUM

[75] Inventor: Herman Lia, Li, Norway
[73] Assignee: Tandberg Data A/S, Oslo, Norway
[21] Appl. No.: 908,633
[22] Filed: Sep. 18, 1986

[30] Foreign Application Priority Data

Sep. 19, 1985 [DE] Fed. Rep. of Germany ....... 3533447

[51] Int. Cl.⁴ .............................................. G11B 5/09
[52] U.S. Cl. ........................................ 360/46; 360/40
[58] Field of Search ........................ 360/45, 46, 68, 40

[56] References Cited

U.S. PATENT DOCUMENTS 3,067,422 12/1962 Hunt ..................................... 360/45
4,473,851 9/1984 Nagura et al. ......................... 360/43
4,547,818 10/1985 Lia ......................................... 360/46

FOREIGN PATENT DOCUMENTS 2055238 2/1981 United Kingdom .

Primary Examiner—Vincent P. Canney
Attorney, Agent, or Firm—Hill, Van Santen, Steadman & Simpson

[57] ABSTRACT

To improve recording of data on a magnetic recording medium such as a magnetic tape, amplitudes of write signals supplied to a magnetic head are modified, dependent on distances between edges of the write signals. The modification occurs such that, given a short spacing, a respective write signal has a greater value than given a large spacing. Amplitudes of the write signals are modified in three steps when the GCR method is employed as a writing method for recording the data, distances of the edges of the write signals being capable of assuming three different values.

11 Claims, 3 Drawing Sheets

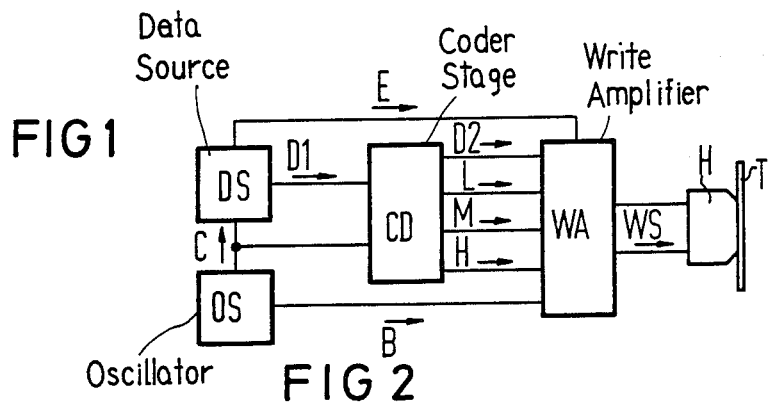
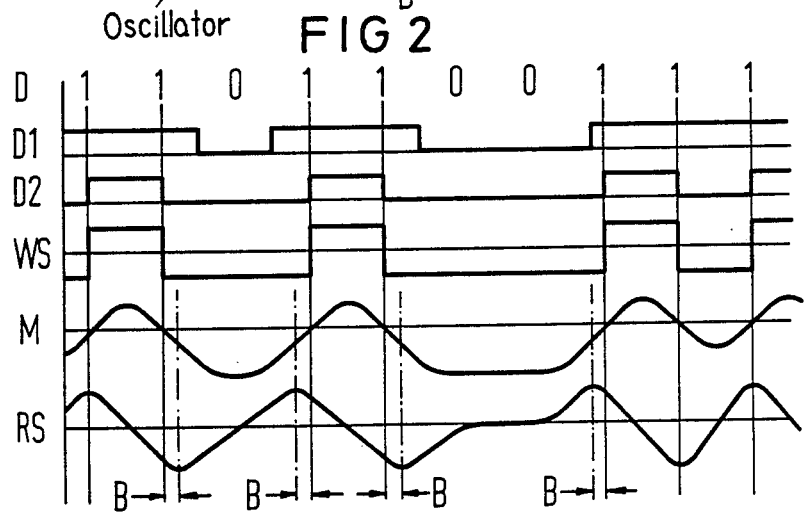
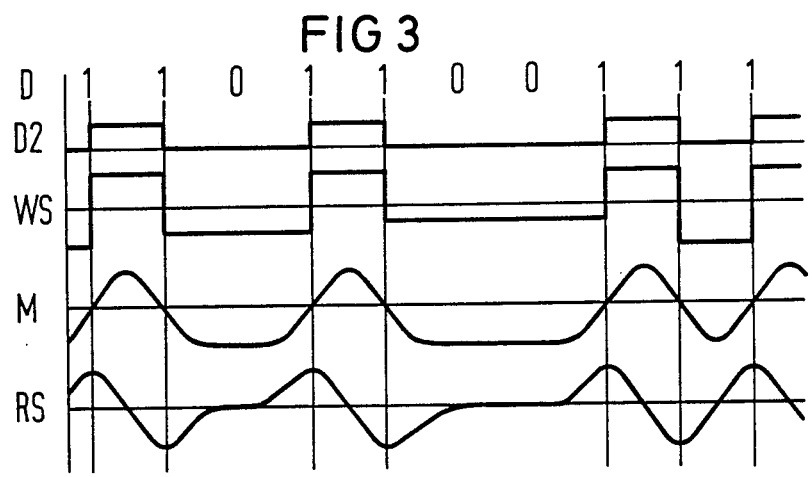

METHOD AND ARRANGEMENT FOR RECORDING DATA ON A MAGNETIC RECORDING MEDIUM

BACKGROUND OF THE INVENTION

The invention relates to a method for recording data on a magnetic recording medium wherein, a write amplifier is employed to which data signals are provided and which emits write signals to a magnetic head. The write signals are allocated to data signals. The write signals cause changes of magnetization on a recording medium.

It is already universally known to employ a direct recording method when recording data on magnetic tape. In accordance with the writing method respectively employed, the magnetization on the recording medium directly corresponds to the pattern of the write signals which are in the form of write currents through the magnetic head. In case, for example, the generally known NRZI or GCR method is employed as a recording method, every binary character 1 of the data to be recorded corresponds to a change of the magnetization, and the magnetization is not changed given the binary character 0. In the GCR method, the data to be recorded are additionally coded such that no more than two binary characters 0 appear between two binary characters 1.

In the direct recording method, no high-frequency pre-magnetization signals are employed. The recording process is thus non-linear and the sensitivity in the recording is slight. Moreover, high write currents are required in order to magnetize the recording medium up to its saturation. These high write currents cause modulation signals and a cross-talk to the neighboring tracks given a multi-track recording.

A further disadvantage of the direct recording method is that a relatively low storage density can be achieved on the recording medium in the longitudinal direction, since a shift of the rated points in time of the peaks of the read signals appears. This is generally known under the designation 'bit shift'. Furthermore, the signal-to-noise ratio is low. The principal reason for the peak shift lies in the asymmetry of the magnetization on the recording medium which results from the respective succession of the binary characters 0 and 1 in the data signal. This occurs since the recording medium is magnetized in both directions up to its saturation, and the remanence in the recording medium is a function of the distances between successive magnetization changes.

The read signals have their maximums at those locations at which the magnetic flux respectively exhibits its greatest slope in the positive direction, and has minimums at those locations at which the magnetic flux respectively comprises its greatest slope in the negative direction. These locations are employed in order to decode the data, the read output signals are normally differentiated, and the zero axis crossings of the differentiated read output signals are identified. The peak shifts consequently correspond to the shifts of the 0 axis crossings. Moreover, the differentiation causes an increase of the noise signals, so that the signal-to-noise ratio is great compared to the magnetization.

When the write-in signals have a high-frequency pre-magnetization signal superimposed on them as is known, for for example, from German OS No. 32 33 489, corresponding to U.S. Pat. No. 4,547,818, incorporated herein by reference, the recording medium is magnetized by pre-magnetization signals with a frequency which is greater than the pass band of the read channel. The magnetization is magnetized up to its saturation.

The high-frequency pre-magnetization signals linearize the recording process and the recording becomes more precise. The recording sensitivity is increased, and this makes it possible to achieve a corresponding magnetization with significantly lower write currents. Fewer modulation signals and a low cross-talk result therefrom as advantages.

SUMMARY OF THE INVENTION

An object of the invention is to specify a method with which it is possible to further increase the recording density both in the direct recording method as well as given employment of pre-magnetization signals.

In accordance with the invention, this object is achieved by employing a write amplifier and providing data signals to the write amplifier which emits write signals to a magnetic head. The write signals are allocated to the data signals and changes of magnetization are caused on a recording medium at those locations which are allocated to edges of the data signals. A respective amplitude of respective write signals is varied dependent on respective spacings of the edges of the data signals. Thus, given a relatively small spacing of the edges, the respective amplitude of the respective write signal is greater than when a relatively large spacing of the edges of the data signals is present.

The method of the invention has the advantage that smaller peak shifts of the read-output signals appear, and thus the overall write-read channel has a higher resolution. Accordingly, a greater recording density can be achieved in the longitudinal direction of the recording medium. The amplitudes of the write signals are modified in accordance with the respective spacings of the edges of the write signals. The lowest amplitude occurs given the greatest spacings, and the greatest amplitude appears given the smallest spacings.

For example, when two-frequency recording mode or phase encoding is employed as a writing method, the amplitudes of the write-in signals are varied in two steps. Given the MFM or GCR writing method, the amplitudes of the write-in signals are varied in three steps in a corresponding fashion.

Control signals for a corresponding write amplifier which emits write currents with different amplitudes as the write signals, can be generated in the following way. It is advantageous when the data signals are delayed in multiple fashion by the respectively smallest, given spacing of the edges of the write-in signals, and when the control signals for the write amplifier are generated from the delayed data signals. These control signals are allocated to the different amplitudes of the write-in signals.

The method of the invention is not only suitable for the direct recording method, but is also suitable given employment of high-frequency pre-magnetization signals.

An advantageous arrangement for the implementation of the method is that a coding stage is provided, the data signals and corresponding clock signals are present thereat, and this coding stage emits control signals to the write amplifier which set the different amplitudes of the write-in signals in the write amplifier.

The write amplifier preferably contains first and second switch elements provided in pairs, whereby the number of pairs corresponds to the number of different amplitudes of the write-in signals. The data signals are inverted or non-inverted at the inputs of the first or second switch elements of each pair, and a respective control signal is supplied to each pair. The outputs of the first or second switch elements are respectively connected to a first or second terminal of the magnetic head via a resistor, a voltage source being connected to the center tap of this magnetic head.

Given use of high-frequency pre-magnetization signals, a further pair of switch elements is provided, the high-frequency pre-magnetization signals being adjacent to the input thereof, and their outputs being connected to the terminals of the magnetic head via resistors.

The coding stage can be fashioned in a conventional way by use of binary switch elements, and in this case, it contains a shift register which generates the data signal in delayed fashion and also contains a decoder network which generates the control signal. Preferably, the coding stage is formed, however, of a correspondingly programmed microcomputer.

BRIEF DESCRIPTION OF THE DRAWINGS

FIG. 1 is a block circuit diagram of the write channel of a means for magnetic recording;

FIG. 2 shows time diagrams of signals in a direct recording method;

FIG. 3 shows time diagrams of signals given the method of the invention;

DESCRIPTION OF THE PREFERRED EMBODIMENTS

Figure 4:
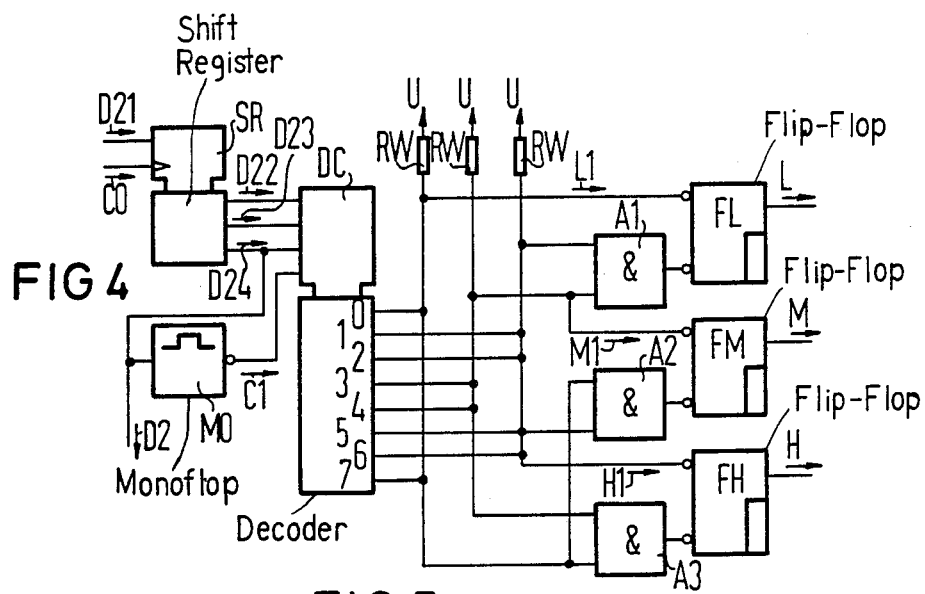
FIG. 4 is a circuit diagram of a part of a coding stage.

In the write channel shown in FIG. 1, given a recording on a magnetic recording medium, for example a magnetic tape T by use of a write head in a magnetic head H, the record data D in the form of binary data signals D (wherein the binary value 1 respectively corresponds to a high level and the binary level 0 corresponds to a low level), are emitted to a coding stage CD by a data source DS. In accordance with the writing method respectively employed, the coding stage CD generates data signals D2 and emits these to the magnetic head H via a write amplifier WA, and emits them as write signals WS in the form of write currents.

It is assumed in the time diagrams shown in FIG. 2 that a prescribed sequence of binary characters is to be recorded on the recording medium T based on the direct recording method, and they are recorded thereon by means of the data signals D. The coder CD generates the data signals D2 which, for example, are coded in accordance with the NRZI or GCR write method, wherein a binary value 1 respectively corresponds to an edge of the data signal D2. It is thus guaranteed that at most two binary values 0 appear between two binary values 1. The write amplifier WA generates the write-in signals WS which have a qualitative path which corresponds to that of the data signals D2. When reading the recorded data by use of a read head (not shown in FIG. 1) in the magnetic head H, read output signals RS are generated whose extreme values appear at the locations having greatest positive or negative slope of the magnetization M on the recording medium T. These extreme values do not always coincide with the edges of the data signals D2, but respectively deviate from these by a value B which represents the peak shift (bit shift).

In the time diagrams illustrated in FIG. 3, the write signals WS qualitatively deviate from the data signals D2 such that the amplitudes vary, dependent on the spacing of the edges of the data signals D2. They vary such that the amplitude of the respective write-in signals WS becomes greater, given a smaller spacing, and smaller given a greater spacing. The consequence thereof is that the magnetization M on the recording medium T respectively comprises approximately identical values in both directions, and thus is symmetrical with respect to a 0 line. The corresponding read output signals RS then have their extreme values precisely at those points in time at which the edges of the data signals D2 appear, or at which the magnetization M proceeds through the 0 point.

For generating the write signals WS shown in FIG. 3, the coding stage CD shown in FIG. 1 generates three control signals L, M, H with which the write signals WS in the write amplifier WA can be set to a low, medium, or high amplitude. Moreover, the write amplifier WA is also supplied with high-frequency pre-magnetization signals B which, just like the clock pulses C, are generated in an oscillator OS. Finally, the write amplifier WA is also supplied with an enable signal E by the data source DS. This enable signal enables the pre-magnetization signal B. The enable signal E can also be supplied to the coding stage CD in order to inhibit the data signals D2 or the control signals L, M, and H.

Further details of the coding stage CD and of the write amplifier WA shall be set forth below with reference to FIGS. 4-6.

In the illustration of the coding stage CD in FIG. 4, the known conversion of the data signal D1 in the form of binary signals as shown in FIG. 2 into data signals D21 by employment of the clock pulses C has not been shown. These data signals D21 are coded in accordance with the known NRZI or GCR write methods. The clock pulses CO are phase-shifted by 180° relative to the clock pulses C, and the data signals D21 are rolled into the shift register SR with them. The data signals D22, D23, and D24 appear at three outputs of the shift register SR, and are respectively delayed by a period duration of the clock pulses CO. Dependent on these data signals, then, an identification is made by use of a decoder DC as to whether the respective amplitude of the write signals WS must assume a low, medium, or high value, i.e. which of the control signals L, M, or H must assume the binary value 1.

In accordance with the GCR write method, a high write signal WS always occurs when two binary characters 1 follow one another. A medium write signal WS occurs when a binary character 1 is followed by a binary character sequence 01. Finally, a low write signal WS appears when a binary character 1 is followed by the binary characters 00. Given a binary character 0, the write signal WS remains unaltered. The table 1 shows the relationship, whereby the bit B0 respectively represents the current bit and the bits B1 and B2 respectively represent the two following binary characters. The character X denotes that the binary character is of no consequence in this case.

|    | D  |    |   |   |   |           |
| -- | -- | -- | - | - | - | --------- |
| B0 | B1 | B2 | L | M | H | WS        |
| 1  | 0  | 0  | 1 |   |   | Low       |
| 1  | 0  | 1  |   | 1 |   | Medium    |
| 1  | 1  | X  |   |   | 1 | High      |
| 0  | X  | X  |   |   |   | Unaltered |

After the coding of the data signals D1 by the coding stage CD, the data signals D21 cannot be employed in accordance with Table 1 instead of the data signals D1. Rather, the coding occurs in accordance with the table 2, i.e. a high write signal WS appears when the sequences of binary characters 100, 010, 101 or 011 appear. In a corresponding way, a medium write signal WS appears when the binary characters 110 or 001 follow one another. Finally, the write signal WS exhibits a low amplitude when the binary characters 0 or 111 follow one another.

| D21 | D23 | D24 | L | M | H |
| --- | --- | --- | - | - | - |
| 0   | 0   | 0   | 1 |   |   |
| 0   | 0   | 1   |   |   | 1 |
| 0   | 1   | 0   |   |   | 1 |
| 0   | 1   | 1   |   | 1 |   |
| 1   | 0   | 0   |   | 1 |   |
| 1   | 0   | 1   |   |   | 1 |
| 1   | 1   | 0   |   |   | 1 |
| 1   | 1   | 1   | 1 |   |   |

The decoder DC shown in FIG 4 to which the data signals D22 through D24 and, in addition, a clock signal C1 are supplied, generates a signal having the binary value 0 at one of eight outputs when the corresponding binary values of the data signals D22 through D24 are present at its input. The clock signals C1 are generated from the data signals D24 at every edge by use of a monoflop MO, and they represent an enable signal for the decoder DC. The decoder DC is designed in such a way that its output transistors do not have any collector resistors. Thus, a wired OR function is possible with it. For this purpose, separate resistors RW are provided, these being respectively connected to a voltage source U.

The control signals L, M, and H are respectively output at the outputs of flip-flops FL, FM, or FH. The flip-flop FH is set when the binary value 0 appears at the outputs 1, 2, 5, or 6 of the decoder DC. Simultaneously, the flip-flops FL and FM are reset with this signal via the AND elements A1 and A2. In a corresponding fashion, the flip-flop FM is set when the binary value 0 is present at the outputs 3 and 4. In this case, the flip-flops FH and FL are reset via the AND elements A3 and A1. Finally, the flip-flop FL is set when the binary value 0 appears at the output 0 or 7, and in this case the flip-flops FM and FH are reset via the AND elements A2 and A3.

Figure 6:
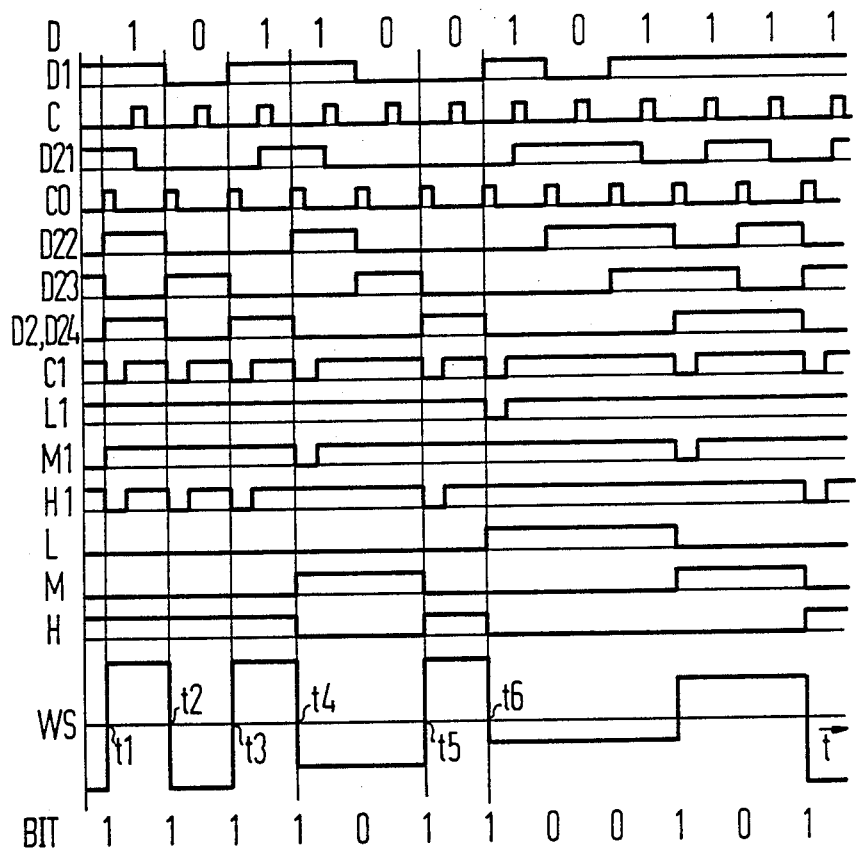
FIG. 6 illustrates time diagrams of signals at various points of the coding stage and of the write amplifier.

As may be seen from FIG. 6, the data signals D22 through D24 exhibit the binary values 101, for example, after the point in time t1, so that the signals H1 with the binary value 0 is emitted at the output 5 of the decoder DC, the flip-flop FH is set or remains set, and the control signal H is output. The analogous case applies to the points in time t2 and t3, at which the signals H1 are respectively emitted with the binary value 0. Simultaneously, the flip-flops FL and FM are respectively reset via the AND elements A1 and A2, and a write signal WS with high amplitude is set via the flip-flop FH.

After the point in time t4, the data signals D22 through D24 form the binary values 100, so that the signal M01 at the output 4 of the decoder DC assumes the binary value 0 and the flip-flop FM is set. The control signal M thus assumes the binary value 1 in order to set a write signal WS with medium amplitude. At the same time, the flip-flops FL and FH are reset via the AND elements A1 and A2. At point in time t5, the signal H1 again assumes the binary value 0 and the flip-flop FH is set, so that a high write signal WS is again set by the control signal H. At time point t6, the data signals D22 through D24 comprise the binary values 000, so that the output signal L1 at the output 0 of the decoder DC is generated and the flip-flop FL is set, whereas the flip-flops FM and FH are simultaneously reset. The control signal L thus assumes the binary value 1 and indicates that a low write signal WS is to be generated.

Figure 5:
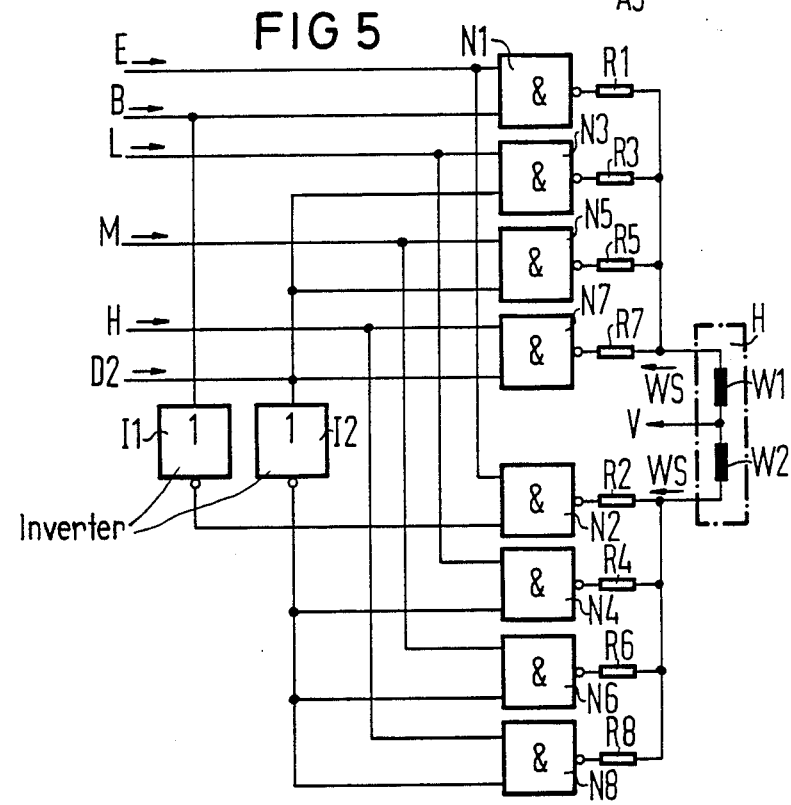
FIG. 5 is a circuit diagram of a write amplifier.

The write amplifier WH shown in FIG. 5 is supplied with the data signals D22 as data signals D2, as well as with the control signals L, M, and H. The write amplifier WA is formed of a plurality of pairs of logic elements which are designed as NAND elements N1 through N8. These NAND elements N1 through N8 do not have any collector resistors, but have external collector resistors R1 through R8 with which the amplitudes of the write signals WS can be set. The NAND elements are connected in pairs and the control signals L, M, H as well as the enable signal E for the pre-magnetization signals B are supplied to respective pairs.

The magnetic head H contains two windings W1 and W2 to whose center tap a voltage source V is connected. The logic elements of a pair are respectively connected to a terminal of the magnetic head via the resistors R1 through R8.

When the enable signal E for the pre-magnetization exhibits the binary value 1, the NAND elements N1 and N2 are enabled and, dependent on the binary values of the high-frequency pre-magnetization signals D, the output of the NAND element N1, N2 is alternately connected to a reference potential as a consequence of an inverter I, so that the pre-magnetization signals WS alternately flow from the voltage source V to the NAND element N1 via the winding W1 and the resistor R1, or via the winding W2 and the resistor R2. The data signals D2 are supplied to the NAND elements N3, N5, and N7, whereas data signals D2 inverted by an inverter I2 are supplied to the NAND elements N4, N6, and N8. Dependent on the control signals L, M, or H, one respective pair of NAND elements N3 and N4, N5 and N6, or N7 and N8 becomes conductive, so that write signals WS flow from the voltage source V to the corresponding NAND elements, depending on whether the binary values of the data signals D2 flow either over the winding W1 and one of the resistors R3, R5, or R7, or via the winding W2 and one of the resistors R4, R6, and R8. The resistors R3 through R8 are graduated such that the write signals WS have corresponding amplitudes, i.e. the resistors R3 and R4 have higher values than the resistors R5 and R6, and these in turn have higher values than the resistors R7 and R8.

In the illustration in FIG. 6, pre-magnetization signals B have not been shown for reasons of a better overview. The effect of these pre-magnetization signals can, however, be derived, for example, from German OS No. 32 33 489.

In case, due to the employment of different write methods, the spacings of the data signals D2 assume only two different values, then for example, the NAND elements N5 and N6 and corresponding resistors R5 and R6 are not used. Given use of further write methods wherein more than three spacings of the edges occur, even further pairs of logic elements can be employed in the write amplifier WA in a corresponding fashion. The employment of the NAND elements N1 and N2 is likewise not required when a direct recording method occurs without the use of the pre-magnetization signals B.

In the described exemplary embodiment, the coder stage CD is conventionally designed with binary logic elements. However it is also possible to construct this coder stage by use of a microcomputer which generates the control signals L, M, and H, dependent on the coding method respectively employed. The coder stage CD can also be designed such that the control signal L is always present as long as data are being recorded. Thus, the control signal M is always present when the write signals WS assume the medium or high value, and the control signals H are only present when the write signals WS assume the high amplitude. In this case, thus a step-wise addition of the various write signals WS occurs, dependent on the data signals D2.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for recording data on a magnetic recording medium, comprising the steps of:
    employing a write amplifier and providing data signals thereto, the write amplifier emitting write signals to a magnetic head;
    allocating the write signals to the data signals and causing changes of magnetization on a recording medium at those locations which are allocated to edges of the data signals; and
    varying a respective amplitude of respective write signals dependent on respective spacings of the edges of the data signals in such fashion that, given a relatively small spacing of the edges, the respective amplitude of the respective write signal is greater than when a relatively large spacing of the edges of the data signals is present.

2. A method according to claim 1 wherein the spacings of the edges of the data signals can assume three different, prescribed values, and the respective amplitudes of the write signals assume three different values, a greatest amplitude being allocated to a relatively small given spacing, a medium amplitude being allocated to a medium spacing, and a low amplitude being allocated to a relatively large given spacing of the edges of the data signals.

3. A method according to claim 1 including the steps of delaying the data signals by at least one of said small given spacings of the edges of the data signals; generating control signals for the write amplifier from the delayed data signals; and allocating said control signals to the varied amplitudes of the write signals.

4. A method according to claim 1 including the step of supplying the write amplifier with high-frequency pre-magnetization signals.

5. An apparatus for recording data on a magnetic recording medium, comprising:

a magnetic head;
write amplifier means receiving data signals and emitting write signals to the magnetic head, the write amplifier means allocating the write signals to the data signals, and the write signals causing changes of magnetization on a recording medium at those locations which are allocated to edges of the data signals; and
means for varying a respective amplitude of respective write signals dependent on respective spacings of the edges of the data signals in such fashion that, given a relatively small spacing of the edges, the respective amplitude of the respective write signal is greater than when a relatively large spacing of the edges of the data signals is present.

6. An apparatus according to claim 5 including a coder stage means receiving data source data signals and generating control signals dependent on the data source data signals, said control signals being allocated to the various amplitudes of the write signals; said coder stage means allocating the data signals fed to the write amplifier means to the data source data signals; and the write amplifier means emitting said write signals to the magnetic head with different amplitudes dependent on the data signals received by the write amplifier means and dependent on said control signals.

7. An apparatus according to claim 6 wherein the write amplifier means has logic elements arranged in pairs, a number of such pairs corresponding to a number of amplitudes of the write signals; the logic elements of each pair being supplied with one of said control signals and with the data signals; outputs of the logic elements being connected via resistors to one terminal of the magnetic head to whose center tap a voltage source is connected.

8. An apparatus according to claim 7 wherein a further pair of logic elements is connected to the magnetic head via resistors; and inputs of these further pair of logic elements are connected to high-frequency pre-magnetization signals and an enable signal.

9. An apparatus according to claim 6 wherein the coder stage means comprises a microcomputer.

10. A method for recording data on a magnetic recording medium, comprising the steps of:
    providing a coder stage which receives data source data signals and outputs data signals;
    employing a write amplifier and providing said coder stage data signals thereto, the write amplifier emitting write signals to a magnetic head; and
    allocating the write signals to the coder stage data signals and causing changes of magnetization on a recording medium at those locations which are allocated to edges of the coder stage data signals; varying a respective amplitude of respective write signals dependent on respective spacings of the edges of the coder stage data signals in such fashion that, given a relatively small spacing of the edges, the respective amplitude of the respective write signal is greater than when a relatively large spacing of the edges of the coder stage data signals is present.

11. An apparatus for recording data on a magnetic recording medium, comprising:
    a coder stage means receiving data source data signals and outputting data signals;
    a magnetic head;
    write amplifier means connected to receive said coder stage means data signals and emitting write signals to the magnetic head, the write amplifier means allocating the write signals to the coder stage means data signals, and the write signals causing changes of magnetization on a recording medium at those locations which are allocated to edges of the coder stage means data signals; and means for varying a respective amplitude of respective write signals dependent on respective spacings of the edges of the coder stage means data signals in such fashion that, given a relatively small spacing of the edges, the respective amplitude of the respective write signal is greater than when a relatively large spacing of the edges of the coder stage means data signals is present.

* * * * *